(12) United States Patent
Maruyama et al.

(10) Patent No.: US 7,391,691 B2
(45) Date of Patent: Jun. 24, 2008

(54) METHOD FOR FACILITATING COPYRIGHT PROTECTION IN DIGITAL MEDIA AND DIGITAL MEDIA MADE THEREBY

(75) Inventors: Haruhisa Maruyama, Kofu (JP); Matthew F. Niemeyer, North Chatham, NY (US); David P. Reis, Lenox, MA (US)

(73) Assignee: General Electric Company, Niskayuna, NY (US)

( * ) Notice: Subject to any disclaimer, the term of this patent is extended or adjusted under 35 U.S.C. 154(b) by 548 days.

(21) Appl. No.: 10/925,090

(22) Filed: Aug. 24, 2004

(65) Prior Publication Data
US 2005/0047321 A1 Mar. 3, 2005

Related U.S. Application Data

(60) Provisional application No. 60/499,219, filed on Aug. 29, 2003.

(51) Int. Cl.
G11B 7/00 (2006.01)
(52) U.S. Cl. .................................. 369/53.21; 369/59.25
(58) Field of Classification Search .............. 369/275.3, 369/275.4, 59.23, 53.21, 59.25, 53.22, 53.25, 369/47.27
See application file for complete search history.

(56) References Cited

U.S. PATENT DOCUMENTS

| 4,809,022 | A | 2/1989 | Wilkinson et al. | 346/135.1 |
|---|---|---|---|---|
| 4,961,077 | A | 10/1990 | Wilson et al. | 346/1.1 |
| 5,608,712 | A | 3/1997 | Rilum et al. | 369/116 |
| 5,940,134 | A | 8/1999 | Wirtz | 348/473 |
| 6,028,620 | A | 2/2000 | Yin et al. | 347/252 |
| 6,141,419 | A | 10/2000 | Gotoh et al. | 380/4 |
| 6,266,299 | B1 * | 7/2001 | Oshima et al. | 369/13.38 |
| 6,423,478 | B1 | 7/2002 | Ha | 430/321 |
| 6,442,276 | B1 | 8/2002 | Doljack | 380/51 |
| 6,487,155 | B1 | 11/2002 | Carson et al. | 369/59.13 |
| 6,580,683 | B1 | 6/2003 | Braitberg et al. | 369/275.3 |
| 6,600,706 | B1 | 7/2003 | Gotoh et al. | 369/47.15 |

(Continued)

FOREIGN PATENT DOCUMENTS

EP 0 549 488 B1 9/1998

(Continued)

OTHER PUBLICATIONS

International Search Report; International Application No. PCT/US2004/027738; International Filing Date Aug. 26, 2004; Date of Mailing Dec. 14, 2004; 7 pages.

(Continued)

*Primary Examiner*—Nabil Hindi
(74) *Attorney, Agent, or Firm*—Richard A. DeCristofaro; Patrick K. Patnode

(57) ABSTRACT

In one embodiment, a disc has a substrate; a data layer on the substrate; an anomaly-feature in the data layer disc capable of generating a read anomaly having a predictable anomaly profile; and anomaly profile data recorded in the data layer for characterizing the anomaly-feature. A disc can be labeled by imposing an anomaly-feature in the data layer capable of generating a read anomaly having a predictable anomaly profile; and disposing anomaly profile data on the disc, wherein the anomaly profile data characterizes the anomaly-feature.

14 Claims, 1 Drawing Sheet

U.S. PATENT DOCUMENTS

| | | |
|---|---|---|
| 6,627,299 B1 | 9/2003 | Feng et al. |
| 6,760,299 B1 * | 7/2004 | Nakajima et al. ......... 369/275.4 |
| 2001/0024420 A1 | 9/2001 | Carson et al. ............ 369/275.3 |
| 2001/0028615 A1 | 10/2001 | Carson et al. ............ 369/47.12 |
| 2001/0046198 A1 | 11/2001 | Morioka et al. .......... 369/59.18 |
| 2002/0048225 A1 | 4/2002 | Shinoda |
| 2002/0069389 A1 | 6/2002 | Sollish et al. ............... 714/758 |
| 2002/0126606 A1 | 9/2002 | Carson .................... 369/53.21 |
| 2002/0141583 A1 | 10/2002 | Barnard et al. ............. 380/202 |
| 2002/0144114 A1 | 10/2002 | Barnard et al. ............. 713/166 |
| 2002/0155381 A1 | 10/2002 | Berneth et al. ......... 430/270.15 |
| 2002/0196729 A1 | 12/2002 | Fairman et al. .......... 369/275.4 |
| 2003/0008234 A1 | 1/2003 | Berneth et al. ......... 430/270.2 |
| 2003/0013041 A1 | 1/2003 | Berneth et al. ......... 430/270.18 |
| 2003/0096192 A1 | 5/2003 | Berneth et al. ......... 430/270.15 |
| 2003/0127439 A1 | 7/2003 | Wee et al. ............. 219/121.73 |
| 2003/0152009 A1 | 8/2003 | Usui et al. ............... 369/59.25 |
| 2003/0179606 A1 | 9/2003 | Nakajima et al. ...... 365/189.01 |
| 2004/0004922 A1 | 1/2004 | Selinfreund et al. ...... 369/53.21 |
| 2004/0083377 A1 | 4/2004 | Wu et al. .................... 713/193 |
| 2004/0110088 A1 | 6/2004 | Vig et al. ............. 430/270.15 |
| 2004/0118931 A1 | 6/2004 | Selinfreund et al. ......... 235/492 |
| 2004/0120236 A1 | 6/2004 | Suzuki et al. .............. 369/52.1 |
| 2004/0121262 A1 | 6/2004 | Selinfreund et al. .... 430/270.15 |

FOREIGN PATENT DOCUMENTS

| | | |
|---|---|---|
| EP | 1 107 251 A1 | 6/2001 |
| EP | 0 741 382 B1 | 10/2001 |
| EP | 1 182 660 A2 | 2/2002 |
| EP | 1 028 422 B1 | 2/2003 |
| EP | 1 363 284 A1 | 11/2003 |
| EP | 1 431 973 A1 | 6/2004 |
| WO | WO 98/08180 A2 | 2/1998 |
| WO | WO 99/60568 A1 | 11/1999 |
| WO | WO 01/75877 A1 | 10/2001 |
| WO | WO 02/056306 A2 | 7/2002 |
| WO | WO 03/017202 A2 | 2/2003 |
| WO | WO 03/019552 A1 | 3/2003 |
| WO | WO 03/079349 A2 | 9/2003 |
| WO | WO 03/087888 A2 | 10/2003 |
| WO | WO 03/107331 A1 | 12/2003 |
| WO | WO 2004/029951 A1 | 4/2004 |

OTHER PUBLICATIONS

Japanese Patent No. JP 5266576; Publication Date: Oct. 15, 1993; Abstract Only; 1 page.

McKee, Terry; "Laser Marking of Polyethylene and Other Polyolefins with Additives"; Plastics Formulating & Compounding; Nov./Dec. 1995; vol. 1; No. 2; pp. 27-30;31.

International Search Report; International Application No. PCT/US2005/033452; Applicant's File Reference 156663-1; International Filing Date Sep. 23, 2005; Date of Mailing Feb. 2, 2006; 6 pages.

* cited by examiner

METHOD FOR FACILITATING COPYRIGHT PROTECTION IN DIGITAL MEDIA AND DIGITAL MEDIA MADE THEREBY

CROSS-REFERENCE TO RELATED APPLICATION

This application claims the benefit of U.S. provisional application No. 60/499,219, filed Aug. 29, 2003, which is incorporated herein in its entirety.

BACKGROUND

The manufacture of digital optical media (i.e., discs) for the distribution of copyrightable content such as software, music, and movies, is becoming ever more common. Such a disc typically contains a version of copyrightable content created by the original author, artist, composer, etc., that has been digitized according to a predetermined format and stored in digital form (data) on the disc. The digital content of the disc can be read and converted into an output data stream (or 'bit stream'), which, in turn, can be rendered in human-perceivable form (text, sound, images, etc.) and/or transferred to another data processing device, by a suitable read device (audio CD (Compact Disc) player, DVD (Digital Versatile Disc) player, disc drives, etc.). Thus, the output data stream represents the content stored on the disc. Some read devices may be associated with, and some include, writing capability for the writing of digital data to a writable disc. Such devices are also sometimes referred to as read/write devices or read/write drives.

Some of the most common industry standards for digitally encoding and decoding copyrightable content on optical discs are found in the 'rainbow' books, e.g., the Red Book for audio CD (Compact Disc Digital Audio System). The Red Book, initially promulgated by Philips and Sony corporations, sets forth technical specifications for CD and CD-ROM (Read Only Memory) formats, including the physical parameters and properties of the CD, the form of digital audio encoding (16-bit PCM), the optical "stylus" parameters, deviations and error rate, modulation system and error correction and other parameters. There is also a Yellow Book, which sets forth similar standards for the format of CD-ROMs, an Orange Book that defines formats for so-called writable and re-writable CDs (CD-R and CD-RW), a White Book for video CD formats, a Beige Book for photo CDs, and others. Most commercial read devices are configured to read data from, and/or write data onto, a disc in a format conforming to one or more of these standards. Such devices may be referred to as conforming devices, e.g., a conforming read/write drive, and may be said to be configured to read and/or write conforming data. Many of the physical and/or optical characteristics of the discs are tightly controlled to ensure the accurate and repeatable retrieval of the encoded digital data thereon. Variations in several of these characteristics will influence the performance of the data retrieval from the disc.

The ease with which conforming digital data can be copied has engendered a need for technological protection against unauthorized copying by copyright infringers. In particular, there is a need in the art for way to allow legitimate publishers of copyrightable content to generate identifying indicia on their discs in a manner that is not easily duplicated in copies made by infringers using conventional copying and reproducing techniques. One prior art attempt to identify legitimate discs has been to physically scribe or scratch a mark onto the disc in a predetermined place. Such markings, however, are difficult to precisely replicate on mass-produced discs and are easily detectable (and are therefore easy to counterfeit).

SUMMARY

In one embodiment a disc comprises a substrate, a data layer on the substrate, a protective layer on the data layer, an anomaly-feature in the data layer of the disc capable of generating a read anomaly having a predictable anomaly profile; and an anomaly profile data recorded in the data layer of the disc to characterize the anomaly-feature.

One embodiment of a method for labeling a disc comprises imposing on the data layer of the substrate, an anomaly-feature capable of generating a read anomaly having a predictable anomaly profile; and disposing anomaly profile data on the disc, wherein the anomaly profile data characterizes the anomaly-feature. The disc comprises a substrate, a data layer on the substrate, and a protective layer on the data layer.

The above-described and other features are exemplified by the following detailed description.

BRIEF DESCRIPTION OF THE FIGURE

Refer now to the FIGURE, which is meant to be exemplary, not limiting.

DETAILED DESCRIPTION OF THE INVENTION

Figure 1:
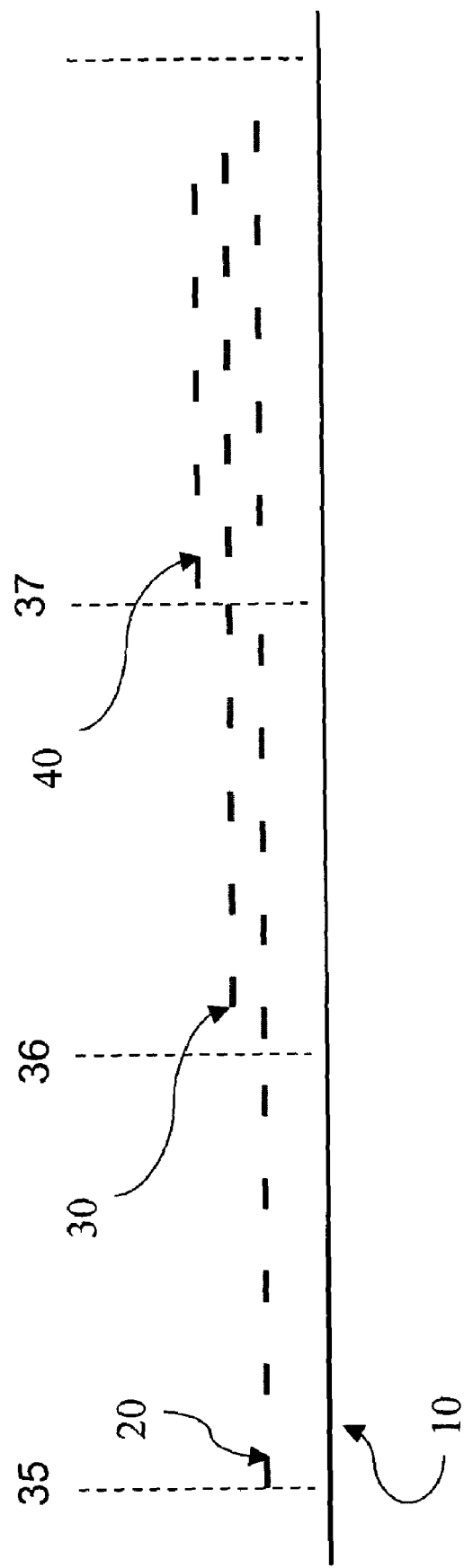
FIG. 1 is a schematic representation of one embodiment of an anomaly-feature on a disc comprising overlaying sequences of marks in staggered relation to each other.

The terms "first," "second," and the like, herein do not denote any quantity, order, or importance, but rather are used to distinguish one element from another, and the terms "a" and "an" herein do not denote a limitation of quantity, but rather denote the presence of at least one of the referenced item. All ranges disclosed herein are inclusive and combinable (e.g., ranges of "up to 25 wt %, optionally 5 wt % to 20 wt %," are inclusive of the endpoints and all intermediate values of the ranges of "5 wt % to 25 wt %," etc.). Unless defined otherwise, technical and scientific terms used herein have the same meaning as is commonly understood by one of skill in the art to which this invention belongs. The modifier "about" used in connection with a quantity is inclusive of the stated value and has the meaning dictated by the context, (e.g., includes the degree of error associated with measurement of the particular quantity). The notation "±10% means that the indicated measurement may be from an amount that is minus 10% to an amount that is plus 10% of the stated value.

An optical digital medium, i.e., optical disc, configured to have digital content data written thereon in a predetermined format, may include an anomaly-feature that generates an anomaly in the performance of a read device (i.e., disc drive) configured to read the digital content data and to produce an output data stream therefrom. As used herein, the term 'anomaly-feature' refers to one or more physical features on an optical digital medium that generates a read anomaly, i.e., a reduction in the rate at which a disc drive receives data from a disc to generate an output data stream. A read anomaly that has predictable characteristics may be reliably recognizable in a disc drive and may serve to identify the medium as the product of a particular source. The characteristics by which the read anomaly may be recognized (i.e., the anomaly profile data) may comprise, e.g., the location on the disc where the read anomaly occurs, the severity of the read anomaly, etc. As described herein, an anomaly-feature may be imposed in data layer of a disc. Optionally, the disc may have anomaly profile data recorded thereon to facilitate the recognition of the disc by a disc drive. Anomaly profile data characterizes the read anomaly and optionally includes program code enabling a disc drive to recognize a read anomaly conforming to the anomaly profile data. The anomaly-feature and, optionally, associated anomaly profile data, may thus allow a disc drive to authenticate, i.e., recognize, a disc on which the anomaly-feature is imposed.

The data transfer rate in a disc drive may be monitored in sampled time intervals, e.g., in millisecond intervals. Represented graphically, a transient slow-down in the data transfer rate may appear as a spike or 'fringe' in the graph, so a detected slow-down may be referred to as a fringe. For example, a fringe may be detected as occurring over an interval of one to 500 milliseconds and may represent a slow-down in the data transfer rate of greater than or equal to about 20% from the nominal standard rate for the disc drive. The number of fringes that occur during the reading of a particular location on the disc or during a selected interval is referred to as a fringe count. Since different disc drives may experience different fringe counts in response to the same anomaly-feature on a given disc, widely useful anomaly profile data may comprise a minimum fringe count or a fringe count range that will be caused by the anomaly-feature on a variety of disc drives. A read anomaly comprising a fringe count of at least 3 fringes at a specified anomaly location or in a specified time period, e.g., at least three fringes per second, in a wide variety of disc drives is widely suitable for authentication purposes. Optionally, anomaly profile data may define a read anomaly comprising 4 to 30 fringes. In one illustrative embodiment, an anomaly-feature may reliably generate a read anomaly comprising 15 to 20 fringes as set forth in corresponding anomaly profile data.

One or more of the characteristics of a read anomaly (i.e., characteristics of the fringe or pattern of fringes in the data transfer rate) may be used to characterize an anomaly-feature on a disc. For example, a read anomaly may be characterized by: (i) the magnitude of the fringe(s) (e.g., the degree of change in the data transfer rate); (ii) the pattern of fringes (e.g., the fringe count or series of fringe counts); (iii) the location(s) on the disc where the slow-down(s) occur; (iv) whether the anomaly-feature generates a correctable error or a non-correctable error; (v) the number of tracks over which an error or a sequence of errors occur; (vi) the time interval between error sequences; and the like, as well as combinations comprising at least one of the foregoing. A location on a disc where a read anomaly may occur may be identified in the anomaly profile data as a particular track, a radius, as a minute-second-frame, and/or by any other suitable location parameter. The selected interval for a fringe count may encompass a plurality of rotations of the disc past the read laser, so an anomaly-feature may extend throughout several turns in the spiral data track to contribute to a single fringe count.

The disc drive may read the anomaly profile data on the disc and then determine whether a read anomaly occurs as described therein. For example, the disc drive may be equipped with an authentication program (e.g., such as the one described in WO 03017202 that published Feb. 27, 2003, based on International Patent Application PCT/US02/26458, entitled "Systems And Methods For Media Authentication Related Applications"). The disc drive is thus able to identify a disc comprising an anomaly-feature, i.e., it is thus able to authenticate the disc. Once the disc is authenticated, the disc drive may then proceed with normal read operation, e.g., proceeding to the table of contents region of the disc. Authentication can be the basis of a copy-protection system. For example, a disc drive may optionally be configured to produce an output data stream from a disc only if the disc has been authenticated. A write device can similarly be configured to prevent a copy operation where the blank disc has not been authenticated and/or where the original disc is authenticated as a copyrighted disc that should not be copied.

Optical discs carry various kinds of data in various regions of the disc, including content data that represents content (e.g., a music track) that is represented in the output data stream from the drive. There is also non-content data which is not represented in the output data stream but which is used by a disc drive to enable it to function or for other reasons (e.g., a TOC (table of contents) data file). Content data is usually stored on a predetermined content region of the disc, and non-content data may be stored in a predetermined non-content region such as a lead-in region, boot-up region, etc. An anomaly-feature (and, therefore, the read anomaly arising therefrom) may be imposed on the disc in either the content region or in a non-content region. Even if the anomaly-feature is in the content region, it may be in a portion of the content region where content data is not stored. This way, the anomaly-feature may be present without impairing the function of the disc or the handling of content data by the disc drive. Anomaly profile data may be stored on a disc in a non-content region, e.g., in the boot-up region.

The anomaly profile data may be on the disc in a readable and even copyable format. The anomaly-feature is detectable because it causes a read anomaly, but it may not be copyable by a standard read/write disc drive since read anomalies (i.e., variations in data transfer rate) are not represented in the output data stream generated by the drive from the disc. Therefore, the anomaly-feature and the read anomaly it causes may be invisible to the end user and need not interfere with the use of the disc in a disc drive. The anomaly-feature may therefore be one that cannot be copied to another disc by or from a standard read/write disc drive, even if the anomaly profile data is read and/or copied. Thus, the anomaly-feature serves to label the disc as the original product from a particular source where the anomaly-feature is first incorporated onto the disc. The likelihood that an authentication system or a copy protection scheme based on the anomaly will be circumvented, or that a disc so labeled could be counterfeited, is thus reduced.

Discs on which an anomaly-feature may be imposed include ROM (Read Only Memory) discs (compact discs (CDs) and digital versatile discs (DVDs), HD-DVD, etc.), writable and re-writable optical discs (CD-R, CD-RW, DVD-5, DVD-9, DVD-10, DVD-18, DVD-R, DVD+R, DVD-RW, DVD+RW, DVD-RAM, DVD, BLU-RAY™ discs, etc., referred to herein collectively as discs or "writable" discs). Such discs generally comprise a data layer on a substrate (e.g., pits, grooves, lands, etc., disposed into a surface of the substrate), with a protective layer (e.g., a layer, coating, or second substrate (such as in the case of a DVD)), over the data layer.

The data layer of a disc can comprise a series of surface features (e.g., pits, grooves, lands, and the like) disposed on (e.g., stamped into) a surface of the substrate during the manufacturing process. The manufacture of the discs can involve the creation of a master (e.g., a glass master) from which a stamper can be generated. The master can be produced by coating a glass plate with a photoresist and marking a series of pits in a predetermined format on the photoresist with a laser beam of a laser beam recorder (LBR). The operating parameters of the laser beam, e.g., the power of the beam, its focus, write speed, etc., are controlled to produce pits and lands of the desired configuration (depth, width, length, etc.), and to dispose the pits and lands in a spiral data track having a predetermined configuration. As discussed further below, the laser beam operating parameters may also be controlled to create anomaly-features on a disc. The photoresist is developed and exposed regions of the photoresist are removed from the glass. The glass and remaining photoresist is then used to create a metal master having a surface that emulates the pits and lands formed on the glass master. A stamper is then produced from the metal master. By imposing an anomaly-feature on the glass master, the anomaly-feature will be manufactured onto the stamper. Alternatively, or in addition, an anomaly-feature may be imposed directly on the stamper. The stamper is used in an injection-molding device to impose the pit pattern on a surface of a substrate formed from a moldable, light-transmissive material, e.g., polycarbonate. The pitted data surface of the substrate is then metallized with a light-reflective metal, e.g., aluminum, to provide a reflective metal layer, and the metal layer is covered with a protective top layer that may comprise, e.g., lacquer. The substrate is transmissive of a laser beam used by a disc drive to shine through the substrate to the data layer. When the pattern of pits and lands spins past the laser beam, the edges of the pits cause changes in the reflected return signal that is monitored by the disc drive, which translates those changes into data. Thus, the manufacture of the disc integrally involves the incorporation of the digital content and the anomaly-feature therein, with each manufactured copy having the same data and anomaly-feature as was imposed on the stamper.

An optically writable disc may comprise a substrate like that of a ROM disc. To manufacture a writable optical disc, a glass master is coated with photoresist and a spiral groove is burned into the photoresist by a laser beam recorder. The operating parameters of the laser beam are controlled to produce a groove of the desired configuration, i.e., desired spiral curvature, width, depth, etc. A metal master and stamper are then produced from the glass master, and are used to produce a substrate having a spiral groove on the data surface thereof. The data layer of a writable optical disc comprises a layer of light-sensitive material deposited in the spiral groove on the data surface of the substrate, opposite from the read surface. The light-sensitive material may comprise either a photo-reactive dye that changes between a transmissive state and non-transmissive state upon exposure to a write laser beam or, in the case of some optically re-writable discs, a light-sensitive phase-change material that changes its optical properties upon exposure to a write laser beam. In some embodiments, the data layer may comprise a phase-change material sandwiched between layers of dielectric material. A reflective metal layer can be applied over the dye, and a protective layer, e.g., lacquer, can be applied over the metal layer. Optionally, the lacquer is printed to visually identify the disc to a user. During a post-manufacture data writing process, a laser beam is directed onto portions of the light-sensitive material in a pattern that simulates the pits in a ROM disc. As a result, when a read laser passes over the data layer, the reflected signal varies in a manner corresponding to the changes resulting from the edges of pits on a ROM disc.

As used herein, the terms 'pit' and 'land' encompass not only the physical pits and lands of a ROM disc, but also the light-changed or light-unchanged regions of a writable or re-writable disc, unless the context requires otherwise. Thus, as described herein, all optical discs carry data thereon in a series of pits and lands. Data properly stored on the disc, i.e., data represented by pits and lands configured to conform to the predetermined format for an associated disc drive is referred to herein as "conforming data".

The use of a laser to affect the photoresist on a glass master, or to affect a light-sensitive material in a writable optical disc, is sometimes referred to as 'burning' or 'writing.' A laser writing process that produces an anomaly-feature on a disc is sometimes referred to herein as 'labeling' the disc.

Disc drives for the foregoing media may include not only read-only drives and read/write drives for computers, but also players dedicated to playing and, optionally, recording, music and/or video content, e.g., home theater DVD players, portable music CD players, etc. Disc drives are configured to read data stored in a predetermined format on an optical disc and to produce a data stream representing the data at a predetermined optimum data transfer rate. Disc drives include error-correction capability so that certain types of read errors resulting from data or media that do not conform to the predetermined format can be corrected. When a read error occurs, the error correction capability slows the rate at which data transfer occurs or causes a cessation in data transfer, thus causing an anomaly in the performance of the disc drive (a 'read anomaly') regardless of whether the error is successfully corrected. A read anomaly may be the result of one or more correctable errors (which do not prevent the disc drive from generating a proper output data stream) and/or one or more uncorrectable errors, which prevent any output data from being derived from the disc where the error occurs. A suitable anomaly-feature may be configured to generate an uncorrectable read error in a disc drive operating at high speed, e.g., 48×, but to generate only correctable errors at slow speed (e.g., 1× to 3×), thus forcing the drive to read the anomaly location slowly and thus causing a read anomaly.

Various anomaly-features can be imposed on optical discs by controlling the laser used to cure the photo resist used in the manufacture of the stamper. An anomaly-feature may include a series of of pits and lands that deviate from a predetermined encoding format, but which may be written in an otherwise conforming writing process; such an anomaly-feature is sometimes referred to herein as an encoding anomaly-feature. In addition, laser characteristics such as duty cycle, power, and beam radius, focus, write speed, etc., can be varied to create an anomaly-feature. For example, groove geometry (in writable discs) and pit geometry (pertaining to ROM discs) are defined, and can be varied, by a change in laser power on laser beam recorder used in making glass masters of discs, to vary the length, depth and width of the pits and lands or groove configuration (other than tracking errors) to exceed the physical dimensions specified by a predetermined format (collectively referred to as data geometry anomaly-features). The path of the laser may also be used in a controlled, non-standard way to generate variations in the predetermined configuration of the spiral of the spiral data track (tracking anomaly-features). Many anomaly-features can also by imposed on a writable optical disc in a post-manufacture process.

An encoding anomaly-feature comprises a series of pit and lands in a sequence not permitted in the encoding format employed for data on that disc (e.g., the standard EFM (eight to fourteen modulation) format for compact discs). In some embodiments, this may be achieved in a single write process by appropriate control of the write laser duty cycle, which affects the pit length and pit-to-land ratio.

A data geometry anomaly-feature include non-conforming configurations of individual pits, lands, and/or groove, for which dimensions such as width, depth, and/or length, etc., are standardized. For example, in a compact disc, the standard pit length is 3 T to 11 T (T being a measure known in the art, based on the ratio of pit length to the linear velocity of the write laser). Therefore, an anomaly-feature on a compact disc comprising data geometry anomaly may comprise a pit having a length less than 3 T or greater than 11 T. For example, an anomaly-feature may comprise one or more 17 T pits. Pit or groove geometry errors may relate to other aspects of a pit or land on the disc, e.g., the width or depth of the pit or land. For example, an anomaly-feature on a CD ROM disc may comprise a pit having a depth of less than or equal to about 125 nanometers (run), optionally less than or equal to about 120 nm, but greater than or equal to about 10 nm. In various embodiments, a CD ROM anomaly-feature may comprise a pit depth of less than or equal to about 15 nm for a ROM disc with a nominal standard pit depth of 120±5 nm. A pit or groove geometry error can be imposed on an optically writable disc by varying the data groove depth or width of the spiral data groove from standard specifications, e.g., by making a groove of less than the standard depth.

Data geometry anomaly-features can be imposed by varying the power in the LBR (laser beam recorder) used to make the ROM or writable disc master (reducing the laser power results in a shallower pit or groove), the write speed, the focus of the laser (which may affect the width of a pit or groove), the laser duty cycle, and/or the like.

An anomaly-feature comprising a tracking anomaly may comprise wobble in the spiral configuration of the data track. Tracking anomaly may be imposed on the data pressed onto a ROM disc or on the spiral groove of an optically writable disc by diverting the spiral path of the laser beam recorder from the predetermined spiral as it writes data or burn a groove on a glass master, by varying the write speed, etc. A tracking anomaly-feature may be configured so that uncorrectable tracking error would occur in a disc drive operating at high speed, but at slow speed (e.g., 1× to 3×) the drive could track on the spiral and recover data without error, but with a detectable slow-down in data transfer rate. Tracking errors can be introduced into the spiral data track of the data burned onto a stamper for a ROM disc or into the groove for data in a writable optical disc via the stamper.

Wobble refers to a portion of a spiral that starts at a conforming distance from the center of the spiral but which departures from the conforming configuration and then, after reaching a maximum deviation from the conforming configuration, returns to a conforming configuration at a later point in the spiral. The amplitude of a wobble is the maximum deviation in radius of the spiral from the conforming configuration. The frequency is the number of wobbles per turn of the spiral. A wobble having a frequency of 1 per turn can be referred to as eccentricity. An anomaly-feature may comprise a wobble having an amplitude of about 25 nanometers to about 3,500 nanometers and a frequency of about 1 hertz to about 100 kilohertz at a rotational speed of about 1×. For example, the wobble may have an amplitude of about 500 nanometers to about 2,500 nanometers. In a particular embodiment, wobble may have an amplitude of about 25 to about 36 nanometers and, optionally, a frequency of about 22 kilohertz. In particular embodiments, an eccentricity of a turn of the spiral in a CD may have a magnitude of about 500 nanometers to about 200 micrometers, e.g., about 70 micrometers.

As indicated above, a stamper may be scored or scratched to create an anomaly-feature. In contrast to physically scoring discs individually in a post-manufacture process, a scored stamper will reliably reproduce the score mark in multiple manufactured discs.

Incorporating anomaly-features into the glass master by controlling the laser beam recorder likewise gives the manufacturer a high degree of control as to the location, frequency and magnitude and other attributes of each desired anomaly. Also, by inserting the anomaly-features into the master or stamper one can insure that the anomaly is replicated precisely in each disc manufactured, thus providing a significant improvement over physically scribing the disc in a post-manufacture process. Many anomaly-features of a ROM disc can be simulated in a writable disc during manufacture and/or in post-manufacture processes. For many commercially available writable discs, a write laser can be powered, for example, to about 5 milliwatts or more, e.g., about 5 to about 10 milliwatts or more, to impose an anomaly-feature on the disc in a post-manufacture process. The duty cycle can be, for example, about 20% to about 80%. The use of a write laser to impose an anomaly-feature on a writable disc in a post-manufacturing processes is a significant improvement over a physical scribe because of the superior precision, control, and the ability to make a non-visible feature on the disc that a laser stylus offers relative to scribing tools.

In one embodiment, an anomaly-feature may comprise a series of pits and lands that may result from over-writing data in a plurality of writing processes, whereby a predetermined series of pits and lands written in one writing process ('first data') overlays the pits and lands of data of another writing process ('second data'). Even if the first data and the second data both comprise conforming data, the overlaying relation of the first data and second data will corrupt their respective pits and lands, yielding an encoding anomaly-feature, a data geometry anomaly-feature, or both. An anomaly-feature that may be produced by over-writing data is sometimes referred to herein as a superimposed data anomaly-feature. In various illustrative embodiments, over-writing may be achieved via dual passes with low power laser, or by masked photolithography on specific regions of exposed glass master. Overwriting may also be achieve on writable optical discs in a post-manufacture process.

Data to be written over other data is sometimes referred to herein as a 'mark,' and the process of writing a mark is sometimes referred to herein as 'marking' the disc. Optionally, each pit and land in a mark, viewed individually, may be a conforming pit or land. For example, for a CD, the mark may comprise a series of properly configured 5 T pits. Such a mark may optionally comprise non-conforming data by embodying encoding anomaly-features. Alternatively, a mark may optionally comprise conforming data. The data over which a mark is written may comprise conforming or non-conforming data, and may optionally comprise another mark.

A superimposed data anomaly-feature resulting from overwriting first data with second data is the same regardless of the order in which the first and second data are written. Furthermore, a superimposed data anomaly-feature resulting from an over-writing process might also be produced in an appropriately specified single write process on a blank disc. Therefore, an overlay or overwriting of data with other data, e.g., overlaying of a mark and other data, or of a mark and another mark, does not require a particular sequence of writing processes, and a superimposed data anomaly feature need not necessarily be produced by a plurality of writing processes. Descriptions of a particular sequence of writing processes to provide overlaying data are provided herein only for convenience of expression in defining the resulting anomaly-feature.

The series of pits in the mark may extend for a predetermined length along the spiral data track. For example, a mark may comprise pits written in the spiral data track for a length of greater than or equal to about 1 millimeter and optionally for less than or equal to about 150 mm, optionally about 1 mm to about 20 mm, e.g., about 1 mm to about 5 mm. In particular embodiments, a mark length may be 2 to 5 mm, or 2 to 4 mm. Thus, a mark may have a length of about 2 millimeters, about 3 millimeters, about 4 millimeters, or about 5 millimeters, for example. Alternatively, a mark may extend along the spiral data track for a distance corresponding to about 0.001 seconds to about 3 seconds at a standard drive speed (1×), e.g., about 2 to about 3 seconds. Optionally, a mark comprises about 1 to about 400 kilobytes of data, specifically about 5 to about 100 kilobytes, and more specifically about 10 to about 20 kilobytes. In one embodiment, a mark may comprise about 400 kilobytes of data. Over the length of the mark, the mark corrupts the pits and lands of the data over which the mark is written, causing a read error and yielding an anomaly-feature that may comprise an encoding anomaly-feature and/or a data geometry anomaly-feature at the anomaly location.

Since disc drives spin discs at a rates of multiple rotations per second, it is possible, and may be advantageous, to provide a plurality of marks within a region of the spiral data track that will be read in one second. For example, an anomaly-feature may be produced by writing one or more marks on each of a plurality of turns of a spiral data track within a selected group of consecutive turns that would be read in one second. For example, if the disc drive spins the disc at 7 rotations per second, it would be expected that the drive would read seven consecutive turns of the spiral per second. A mark may be written on two or three or more of a selected seven consecutive turns, e.g., on the first, third, and fifth turns, to generate a read-anomaly comprising a desired number of fringes per second. In one embodiment, an anomaly-feature comprises one or more marks written on each of at least three turns of the spiral data track, optionally on greater than or equal to about four turns within a selected group of consecutive turns that would be read in one second. In such embodiments, the anomaly location may be described as extending over a plurality of turns of the spiral or, alternatively, at the specific locations of each of the various marks comprising the anomaly-feature. Corresponding anomaly profile data may indicate a read anomaly at those turns of the spiral data track having a corresponding minimum fringe count.

A sequence of marks may extend over a part of a track on a disc or over a number of tracks or turns, e.g., over about 1 to about 50 turns. Marks may be separated by specified lengths (along a track) and/or time intervals. Absolute time in pre-groove (ATIP) time position may be used to specify where a mark or other anomaly-feature is imposed on a disc. For example, ATIP data can be used to identify the beginning of a mark sequence and the mark length. ATIP data can also be included in anomaly profile data to indicate where a read anomaly resulting from an anomaly-feature is expected to be encountered on a disc. In one embodiment, an anomaly-feature may comprise a plurality of marks or mark sequences within a single spiral turn. In alternative embodiments, one or more marks may be written in one or more data tracks.

As indicated above, an anomaly-feature may be produced by writing one or more marks over one or more other marks. For example, an anomaly-feature may comprise a first mark sequence that may optionally overlay other data, e.g., conforming data, and a second mark sequence written over the first mark sequence. In one embodiment comprising staggered overlaying marks, a first mark sequence includes an initial mark or marks and a latter mark or marks written along the spiral data track, and a second mark sequence includes marks that at least partly overlay marks in the first plurality in staggered relation thereto, i.e., overlaying only a latter mark or marks of the first mark sequence. The second mark sequence comprises an initial mark or marks followed by a latter mark or marks. Optionally the anomaly-feature may comprise a third mark sequence overlaying the second mark sequence, optionally in staggered relation thereto. Optionally, the third mark sequence may also overlay the first mark sequence, including those already overwritten by the second mark sequence. FIG. 1 schematically illustrates a data track 10 of a disc, on which is written a first mark sequence 20 beginning at an position identified as ATIP second 35 on the data track, a second mark sequence 30 written over the first mark sequence 20 in staggered relation thereto, beginning at ATIP second 36, and a third mark sequence 40 beginning at ATIP second 37 and written over both the first mark sequence 20 and the second mark sequence 30, in staggered relation to both. In such an embodiment, latter marks in the first mark sequence may be increasingly over-written, and it will be understood that as a disc drive reads the first mark sequence, an increasing number of read errors will be generated as the disc drive encounters the marks once over-written (by initial marks of the second mark sequence) and marks twice over-written (by latter marks in the second mark sequence and marks of the third mark sequence).

In some embodiments, an anomaly-feature may generate a plurality of correctable errors that create one or more fringes in the data transfer performance of the disc drive. For example, an anomaly-feature for a compact disc may generate a plurality of correctable errors of one or more types commonly known as E11, E21, E31, E12, and E22 errors. Optionally, an anomaly-feature may generate one or more non-correctable errors. In particular embodiments, an anomaly-feature may generate a plurality of correctable errors followed by one or more non-correctable errors. For example, on a compact disc, an anomaly-feature may generate correctable errors of the types E11, E21, etc., before generating one or more non-correctable errors, e.g., E32 errors. Marks 2 mm in length generate more correctable errors and fewer non-correctable errors, e.g., more E12 and E22 errors and fewer E32 errors, relative to marks 4 mm in length.

In a particular embodiment, an anomaly-feature on a compact disc may generate an increase in E22 errors prior to the generation of E32 errors. For example, an anomaly-feature that generates a rise of E22 errors from zero to about 100 over the course of about 1 second during which E32 errors are less than E22 errors was readily recognized in a variety of disc drives. Optionally, the rate at which correctable errors occur on a disc increases in advance of the non-correctable error or errors caused by an anomaly-feature. In this way, a detectable read anomaly can be induced in even a high-performance disc drive before a non-correctable error is encountered, even if the disc drive is able to correct correctable errors at the initially low occurrence rate without experiencing a read anomaly.

In one embodiment, an anomaly-feature comprises about 400 kilobytes of data written over a span corresponding to about 2 to about 3 seconds (at 1×) and generates about 400 to about 700 E32 counts.

In a particular embodiment, an anomaly-feature may generate a BLER (Block Error Rate) Max of 100 to 200; a BERL (Burst Error Length) Max of 12 to 25, E32 Max of 200 to 900, optionally E32 max of 200 to 700, E31 Max of 100 to 170 and E32 Tot of 2,000 to 4,000.

The ability to precisely reproduce an anomaly-feature on numerous media copies is advantageous for the optimum use of anomalies for copy authentication and protection as described herein because such precision facilitates the reliable use anomaly profile data to authenticate mass-produced media. Such precision also permit reliable authentication even when the read anomaly caused by the anomaly-feature varies from drive to drive. This combination of precision and variability reduces the opportunity for an infringer to circumvent the anti-piracy technology based on such anomaly-features. The anomaly-features disclosed herein permit a digital optical disc to be labeled in a manner that can be detected in the reading of a disc without significant adverse affect on the output data stream derived therefrom and thus provide a significant advantage to the successful commercialization of a copy protection system.

EXAMPLE 1

A commercially available CD-R 700 megabyte (MB) disc was labeled with marks comprising 5 T pits using a laser powered at 10 milliwatts with a 50% duty cycle. The anomaly location data is indicated in the following Table 1.

TABLE 1

| Mark number | Anomaly Location data | | | | | Mark Length (mm) |
| --- | --- | --- | --- | --- | --- | --- |
| | Min | Sec | Frame | Radius (mm) | Track | |
| 1 | 0 | 40 | 0 | 25.9 | 15 | 4 |
| 2 | 0 | 38 | 0 | 25.9 | 30 | 2 |
| 3 | 0 | 38 | 5 | 25.9 | 30 | 2 |
| 4 | 0 | 35 | 0 | 25.9 | 30 | 1 |
| 5 | 0 | 35 | 5 | 25.9 | 30 | 1 |

It will be appreciated that marks 1-5 are staggered relative to one another and that they partially overlap, causing a superimposed data anomaly-feature. The anomaly-feature represented in the table generated more than seven hundred E22 errors and more than one hundred E12 errors before a rise in E32 errors was noted. The disc bearing this anomaly-feature was authenticated in both a CD drive and a DVD drive.

EXAMPLE 2

A commercially available CD-R 700 megabyte (MB) disc was labeled with marks comprising 5 T pits using a laser powered at 10 milliwatts with a 50% duty cycle. The anomaly location data is indicated in the following Table 2.

TABLE 2

| Mark number | Anomaly Location data | | | | | Mark Length (mm) |
| --- | --- | --- | --- | --- | --- | --- |
| | Min | Sec | Frame | Radius (mm) | Track | |
| 1 | 0 | 39 | 0 | 25.9 | 20 | 3 |
| 2 | 0 | 38 | 0 | 25.9 | 7 | 2 |
| 3 | 0 | 37 | 0 | 25.9 | 4 | 2 |
| 4 | 0 | 36 | 0 | 25.9 | 2 | 2 |
| 5 | 0 | 35 | 0 | 25.9 | 30 | 1 |

It will be appreciated that marks 1-5 are staggered relative to one another and that they partially overlap, causing a superimposed data anomaly-feature. The anomaly-feature represented in the table generated more than five hundred E22 errors and more than one hundred E12 errors before a count of E32 errors in excess of 100 was noted.

Optical discs as described herein are labeled with anomaly-features that can be precisely reproduced in high-volume production processes, and optionally in post-manufacturing processes. The anomaly-features cause predictable read anomalies that can be recognized in standard disc drives to allow the discs to be authenticated. Since the disc can comprise data characterizing the read anomaly caused by the anomaly-feature, i.e., anomaly profile data, the disc itself can provide the drive with all necessary information for authentication. Optionally, the anomaly-features may be imposed on the disc in the manufacturing process in a manner that does not permit reproduction in optical read/write drives, e.g., by the use of non-conforming parameters for the laser beam recorder used to make a glass master. Even if the anomaly-features described herein are made in post-manufacturing processes, the read anomalies they generate need not affect the data output stream produced by the disc drive, so the anomaly-features will be difficult to detect and replicate. The need for anomaly-features such as unbalanced discs, which would degrade the performance of the disc drive when reading data at all locations on the disc, and markings on the outer surfaces of the disc, which can easily be detected and which are difficult to replicate precisely, can be avoided by the use of anomaly-features as described herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A disc, comprising:
a substrate;
a data layer on the substrate;
a protective layer on a side of the data layer opposite the substrate;
an anomaly-feature in the data layer capable of generating a read anomaly having a predictable anomaly profile, wherein the anomaly-feature comprises a superimposed data anomaly-feature comprising first data overlying second data; and
anomaly profile data in the data layer for characterizing the anomaly-feature.

2. The disc of claim 1, wherein one or both of the first data and the second data comprises a mark comprising a series of pits and lands extending for a distance of about 1 mm to about 50 mm along a spiral data track.

3. The disc of claim 2, wherein one or both of the first data and second data comprises a mark sequence.

4. The disc of claim 3, wherein the first data comprises a first mark sequence and the second data comprises a second mark sequence, and wherein the second mark sequence overlays the first mark sequence in staggered relation thereto.

5. The disc of claim 4, further comprising a third mark sequence overlaying the second mark sequence in staggered relation thereto.

6. A disc, comprising:
a substrate;
a data layer on the substrate;
a protective layer on a side of the data layer opposite the substrate;
an anomaly-feature in the data layer capable of generating a read anomaly having a predictable anomaly profile; and
anomaly profile data in the data layer for characterizing the anomaly-feature wherein the disc comprises a predetermined format comprising a spiral data track configuration, and wherein the anomaly-feature comprises wobble in the spiral data track; and anomaly profile data in the data layer for characterizing the anomaly-feature.

7. The disc of claim 6, wherein the wobble has an amplitude of about 25 nanometers to about 3,500 nanometers and a frequency of about 1 hertz to about 100 kilohertz at a rotational speed of about 1×.

8. The disc of claim 7, wherein the wobble has an amplitude of about 50 to about 1,600 nanometers.

9. The disc of claim 6, wherein the wobble comprises eccentricity having a magnitude of about 500 nanometers to about 200 micrometers.

10. A method for labeling a disc, the method comprising:
imposing an anomaly-feature in the data layer capable of generating a read anomaly having a predictable anomaly profile;
disposing anomaly profile data on the disc, wherein the anomaly profile data characterizes the anomaly-feature; and
overwriting first data with second data;
wherein the disc comprises a substrate and a data layer with a protective layer on a side of the data layer opposite the substrate.

11. The method of claim 10, wherein one or both of the first data and second data comprises a mark comprising a series of pits and lands extending for a distance of about 1 mm to about 50 mm along the spiral data track.

12. A method for labeling a disc, the method comprising:
imposing an anomaly-feature in the data layer capable of generating a read anomaly having a predictable anomaly profile; and
disposing anomaly profile data on the disc, wherein the anomaly profile data characterizes the anomaly-feature;
wherein the disc comprises a substrate and a data layer with a protective layer on a side of the data layer opposite the substrate and comprises a predetermined format comprising a spiral data track configuration, and further comprising writing data on the disc in a configuration defining a wobble in the spiral data track.

13. A method for labeling a disc, the method comprising:
imposing an anomaly-feature in the data layer capable of generating a read anomaly having a predictable anomaly profile; and
disposing anomaly profile data on the disc, wherein the anomaly profile data characterizes the anomaly-feature, wherein the anomaly-feature further comprises wobble having an amplitude of about 25 nanometers to about 3,500 nanometers and a frequency of about 1 hertz to about 100 kilohertz at a rotational speed of about 1×;
wherein the disc comprises a substrate and a data layer with a protective layer on a side of the data layer opposite the substrate.

14. A method for labeling a disc, the method comprising:
imposing an anomaly-feature in the data layer capable of generating a read anomaly having a predictable anomaly profile; and
disposing anomaly profile data on the disc, wherein the anomaly profile data characterizes the anomaly-feature, wherein the anomaly-feature further comprises eccentricity having a magnitude of about 500 nanometers to about 200 micrometers;
wherein the disc comprises a substrate and a data layer with a protective layer on a side of the data layer opposite the substrate.

* * * * *